UNITED STATES PATENT OFFICE.

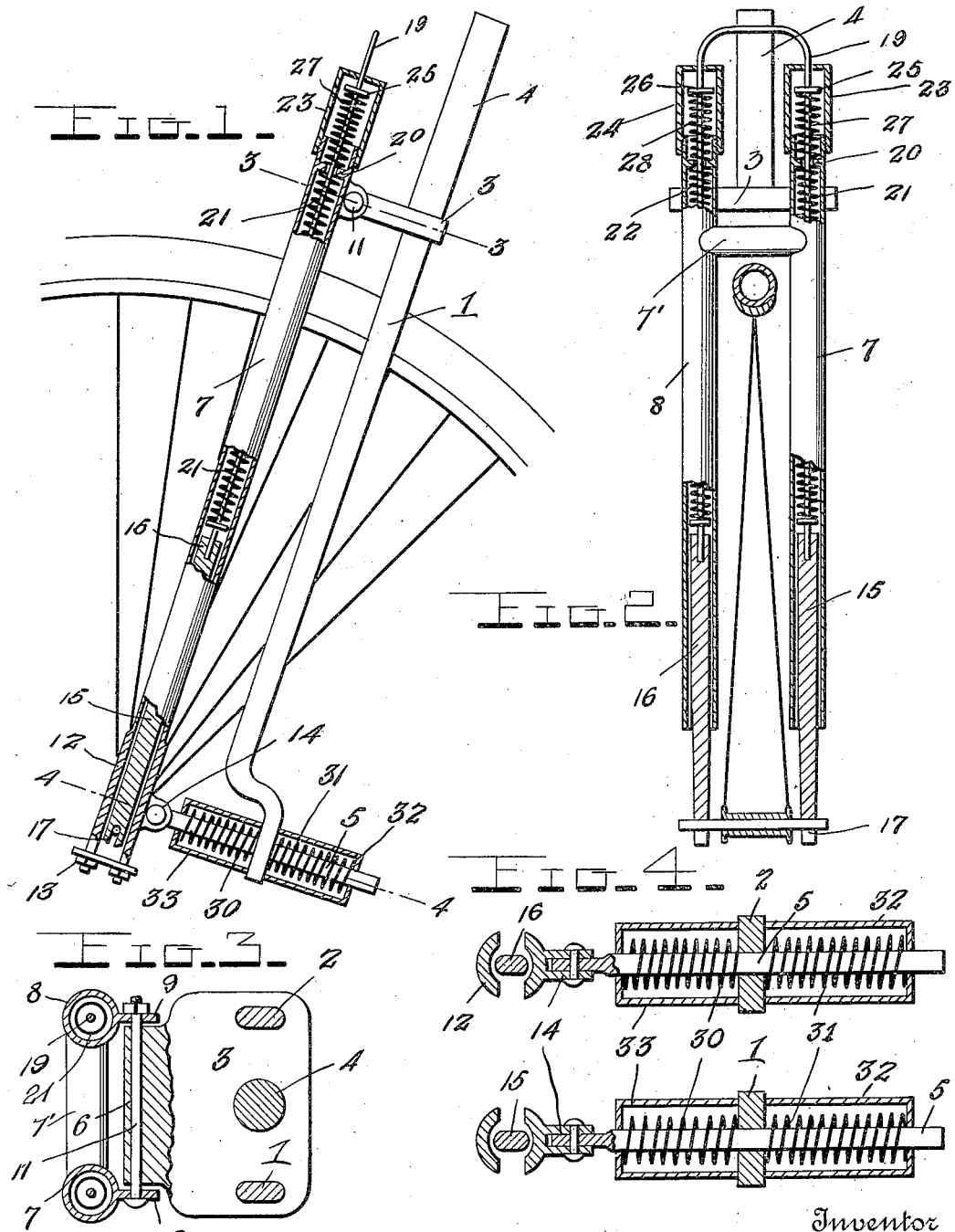

CHARLES BLANKENHEIM, OF CHICAGO, ILLINOIS.

SPRING-FORK FOR BICYCLES.

934,708.

Specification of Letters Patent. Patented Sept. 21, 1909.

Application filed August 31, 1908. Serial No. 450,980.

*To all whom it may concern:*

Be it known that I, CHARLES BLANKENHEIM, a citizen of the United States, residing at Chicago, in the county of Cook and State of Illinois, have invented certain new and useful Improvements in Spring-Forks for Bicycles; and I do declare the following to be a full, clear, and exact description of the invention, such as will enable others skilled in the art to which it appertains to make and use the same.

This invention contemplates certain improvements in spring forks for bicycles, and particularly comprises the construction of a spring fork designed to relieve the vertical and the horizontal strain upon the front wheel.

One of the objects of the invention is the production of a spring fork simple in construction, which will efficiently relieve the vertical as well as the horizontal strain upon a front wheel without interfering in any way with the guiding of said wheel.

Another object of the invention is the production of a spring fork for bicycles comprising means for relieving the vertical strain upon a front wheel, and means for relieving the horizontal strain upon the front wheel so arranged that the different means may be operated independently of each other and without complicating the guiding of said wheel.

With these and other objects in view, the invention consists of certain novel features of construction, combination and arrangement of parts, as will be more fully described and particularly pointed out in the appended claims.

In the accompanying drawings, Figure 1 is a side elevation in section of my improved spring fork, Fig. 2 is a front elevation in section of my improved fork, Fig. 3 is a horizontal section taken on the line 3—3 of Fig. 1, and Fig. 4 is a horizontal section taken on the line 4—4 of Fig. 1.

Corresponding and like parts are referred to in the following description and in all the views in the drawings by the same reference characters.

My improved spring fork is particularly adapted for motor cycles, but may be employed in connection with bicycle frames of any description, and comprises a rigid fork having arms 1 and 2, which are connected at their uppermost ends by a crown head 3, said crown head being mounted on the lower end of the bicycle fork stem 4. The fork arms 1 and 2 extend downwardly from the crown head 3 and at an angle substantially common to the fork stem 4. At their lower ends the rigid fork arms 1 and 2 are bent at right angles to their body portion and again bent downwardly in line parallel with the body portion, but on a different plane. Said ends are apertured to receive hinged pin bolts 5, which are arranged to extend therethrough. The crown 3 extends at a slight incline and at right angles from the fork stem to form connections with a pair of spring fork arms or cushion tubes, which are hinged thereto and for this purpose the crown piece 3 is formed with a hinged joint 6. A pair of tubular members 7 and 8 having hinged lugs 9 and 10, formed thereon are pivotally secured on the crown piece 3 by means of a lock bolt 11. The tubular members 7 and 8 extend downwardly from the crown piece 3, and on a line parallel with the rigid fork arms 1 and 2 so as to form connections with the axle of the front wheel. The lower ends of the tubular members are provided with reinforcing tubes 12, which are connected to said tubular members by lock nuts 13. The reinforcing tubes 12 are formed with hinged joints 14, which pivotally connect with the pin bolts 5. A pair of guide members 15 and 16, are slidably mounted in the tubular members 7 and 8, and said guides are formed at their lower ends with slots 17 and 18 adapted to accommodate the ends of the shaft of the front bicycle wheel.

A U-shaped rod 19 projects downwardly through the tubular members 7 and 8, and is connected to the guide members 15 and 16, and the middle body portion of said rod extends upwardly from the tubular members 7 and 8. Each of the tubular members is formed with an internal shoulder 20, through which the rod 19 extends. The shoulder 20 is positioned preferably above the crown piece 3, and a pair of springs 21 and 22 surround the inclosed ends of the rod 19 and normally press against the shoulder and the guides. The upper portion of the tubular members 7 and 8 are provided with caps 23 and 24 which are formed with apertures arranged to permit the free movement of the rod 19. Said rod is provided with a plurality of washers 25 and 26, which are rigidly mounted thereon, and springs 27 and 28, which are passed around the rod 19 and positioned between the shoulder 20 and the rigid washers 25 and 26.

Springs 30 are mounted on the pin bolt 5 between the hinged joint of said bolt on the forward side of the rigid fork arms 1 and 2, and springs 31 are mounted on the opposite ends of the pin bolts and held in place by caps 32 which are secured to the rear side of the rigid fork arms 1 and 2. Caps 33 are secured to the forward side of the rigid fork arms 1 and 2 and inclose the springs 30.

The cushion tubes 7 and 8 are adapted to take up any vertical strain such as would occur when the front wheel contacts with an obstruction and the springs 30 and 31 are adapted to take up any horizontal strain upon the front wheel. During the movement of a bicycle, provided with my improved fork, over the ground the front wheel may be freely revolved on said fork and the operator may freely steer the same along any desired road. When the front wheel contacts with an obstruction such as a boulder the springs 30 and 31 will be compressed horizontally, and the springs 21 and 22 will be compressed vertically so that the jolt which would certainly result from such contact will be absorbed by said springs. As the wheel passes over the obstruction the springs 27 will receive the downward rebound of the wheel and springs 28 will receive the forward rebound of the wheel so that there will be no reactionary jolt due to the re-positioning of the wheel on the fork.

It will be seen from the foregoing description and from the accompanying drawings that the operation of the cushion tubes is practically independent of the operation of the horizontal compression springs. The importance of this construction will be readily recognized. The crown piece 3, the rigid fork arms 1 and 2, together with the pin bolts 5 will prevent any side play of the wheel on said fork and the various hinged joints will not become weakened by hard usage. When it is desired to disconnect my improved fork from a bicycle wheel the lock bolts 13 are removed from connection with the reinforcing tubes 12 and the guide members 15 and 16 raised off the axle of the front wheel. The movement of the guide members 15 and 16 in the tubular members 7 and 8 is balanced by the rod 19 so that the front wheel is practically kept in a true position at all times on the fork.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described my invention, what I claim and desire to secure by Letters Patent is:—

1. In a device of the class described, a bicycle frame having a forked stem, a fork rigidly mounted on the fork stem of the bicycle frame, a cushion fork pivotally mounted on the rigid fork, a bicycle wheel mounted on the cushion fork, a U-shaped brace or rod secured inwardly at its opposite ends to the cushion fork and means for relieving the horizontal strain received by the wheel.

2. A fork rigidly secured to a bicycle frame, a cushion fork extending from the rigid fork, means for connecting the front bicycle wheel to the cushion fork, pin bolts connected to the cushion fork and extending through the lower ends of the rigid fork, and compression springs mounted on the pin bolts.

3. In a device of the class described, a plurality of rigid fork arms connected to the forward end of a bicycle frame, each of said fork arms being formed with rearwardly and downwardly bent end portions, a crown piece formed with a hinged joint, a plurality of tubular members having hinge lugs formed thereon pivotally mounted on the crown piece and extending downwardly and parallel with the rigid fork arms, a front wheel mounted on the cushioning tubes, means for securing the front wheel in position on the cushion tubes, reinforcing tubes for the cushion tubes, each of the reinforcing tubes being formed with hinged lugs, pin bolts extending through the lower ends of the rigid fork arms pivotally connected to the reinforcing tubes, springs mounted on the pin bolts, guides movable on the cushion tubes, and a U-shaped rod connecting the guides and compression springs mounted on the rod.

4. In a device of the class described, a plurality of rigid fork arms mounted on the front end of a bicycle frame, a crown piece extending forwardly of the rigid fork arms, a plurality of tubes hinged to the crown piece, guides slidable in the tubes, a U-shaped rod connecting the guides, compression springs mounted on the device, and around the rod for receiving the upward strain of a bicycle wheel, compression springs mounted on the device for receiving the vertical rebound of the bicycle wheel, a plurality of pin bolts hinged to the tubes slidable on the ends of the rigid fork arms, compression springs for receiving the horizontal strain of a bicycle wheel, and compression springs for receiving the horizontal rebound of said wheel.

In testimony whereof I have hereunto set my hand in presence of two subscribing witnesses.

CHARLES BLANKENHEIM.

Witnesses:
 ANDREW R. LEITZ,
 NICHOLAS J. SCHMITZ.